Dec. 2, 1969    K. M. KOSANKE ETAL    3,482,182
CONTROLLED SYSTEMS FOR EFFECTING SELECTIVE LASING
Filed May 1, 1964    2 Sheets-Sheet 1
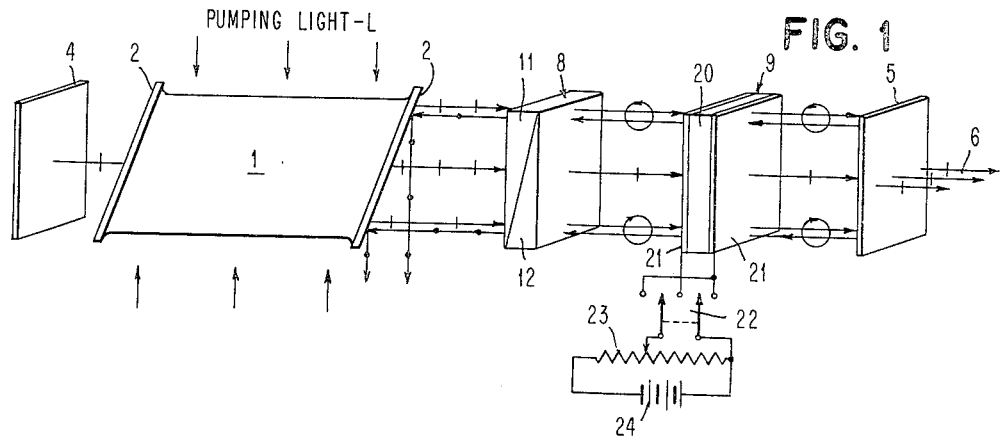
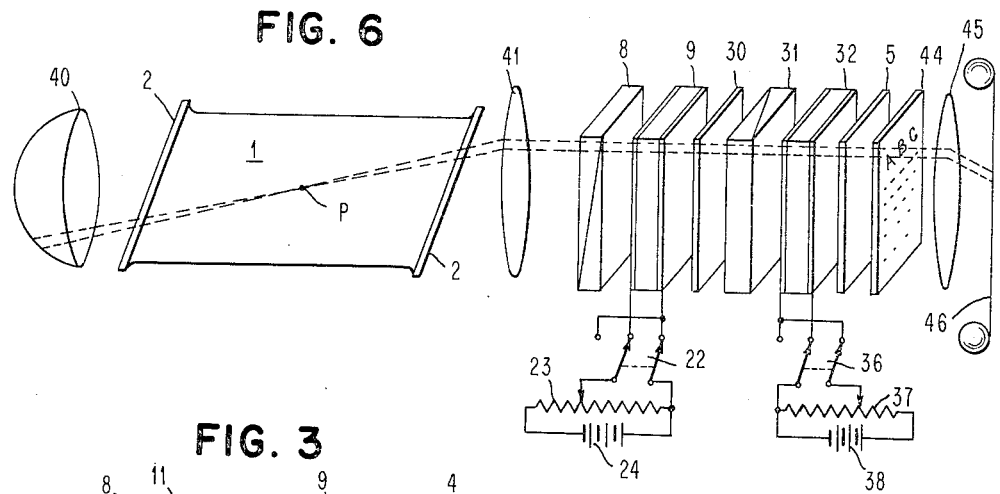
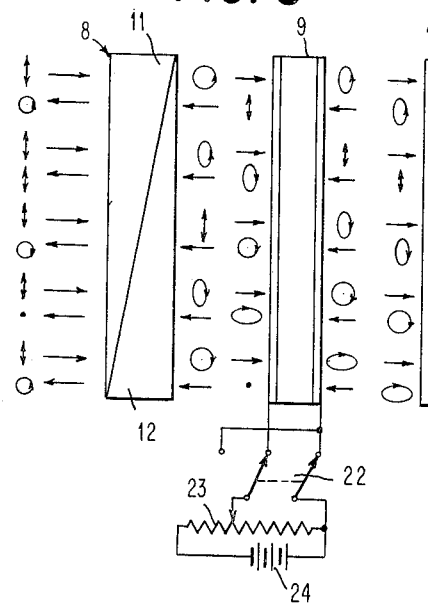
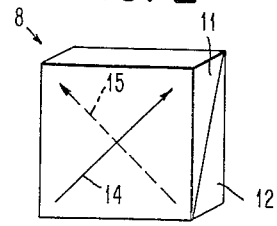
INVENTORS
KURT M. KOSANKE
WERNER W. KULCKE
ERHARD MAX
BY Ralph C. Rustin
ATTORNEY

United States Patent Office 3,482,182
Patented Dec. 2, 1969

3,482,182
CONTROLLED SYSTEMS FOR EFFECTING SELECTIVE LASING
Kurt M. Kosanke, Werner W. Kulcke, and Erhard Max, Wappingers Falls, N.Y., assignors to International Business Machines Corporation, New York, N.Y., a corporation of New York
Filed May 1, 1964, Ser. No. 364,207
Int. Cl. H01s 3/10
U.S. Cl. 331—94.5    6 Claims

ABSTRACT OF THE DISCLOSURE

Apparatus is provided in a laser cavity for effecting a lasing action in selected light filaments provided from the light emitting medium within the cavity. Optical plates are positioned in the cavity in the path of all of the filaments of light emitted by the medium. These plates are operative to provide all but one filament with differing polarizations from the polarization of the light emitted by the medium. Babinet compensator plates may be positioned in the cavity for effecting a gradient variable phase shift on the polarization of the light filaments and an electro-optic device may be associated with the Babinet compensator plates to effect a phase shift equal and opposite to that effected by the Babinet compensator plates on any particular filament of light so that this filament is selected for lasing.

---

This invention relates to laser control systems, and more particularly to mechanisms associated with a laser for effecting a lasing action in selected filaments and modes of a negative temperature medium.

It is well known that a laser includes a medium which emits light when subjected to the optical pumping action of another intense light. The medium in that state is often called a negative temperature medium. At each end of the medium is a mirror which reflects emitted light back into the medium to effect a lasing action which amplifies many times the light produced. One of the mirrors is made only partially reflecting so that a coherent narrow band light passes through it in a beam that may be employed for various uses. When the amount of light reflected back into the negative temperature medium is reduced only a few percent below a predetermined value, lasing action within the medium stops.

A negative temperature medium may be thought of as if it were made up of many small portions or filaments which are capable of lasing independently of each other. If the light reflected back through one or more of these filaments is sufficient to effect a lasing action within them, then they continue to emit light even though lasing action in other filaments may be cut off due to the low level of light reflected back through them.

Certain types of negative temperature media, such as a properly oriented ruby, emit plane polarized light when activated. Other types of negative temperature media, such as gases, can be made to lase plane polarized light by providing at the ends of the medium some means, such as Brewster windows, which pass only light polarized in a given plane. Lasing action within filaments may be controlled by providing within the laser cavity between the medium and the reflecting mirrors some means which changes the polarization of the light reflected back to all filaments except those from which it is desired that light be emitted. If the light reflected back at certain points is plane polarized in such a direction that it is passed by the Brewster windows to the medium, then lasing action in the filaments corresponding to those points takes place and light is obtained from the output mirror at the same points. Reflected light which is elliptically or circularly polarized will have components which are passed by the Brewster windows to the medium but they are insufficient to maintain lasing action. Any light plane polarized at 90 degrees to the direction at which it is passed by the Brewster windows will be reflected by the Brewster windows away from the medium.

The means for controlling the polarization of the light corresponding to different laser filaments may comprise one or more Babinet compensators and one or more electro-optic phase plates. Light passing through a Babinet compensator of first order midway between its ends is not changed in polarization. If the electro-optic phase plate has no voltage applied across it, then it also has no effect on the polarization of the light. Light passing from a negative temperature medium through the midportion of said Babinet compensator and an unenergized electro-optic phase plate to a mirror, will be reflected back to the medium and effect a lasing action within a corresponding portion of the medium. All light passing through other portions of the Babinet compensator will experience a change in polarization and will be reflected back to the medium with insufficient intensity to support a lasing action. When a voltage is applied to the electro-optic phase plate, a change in the polarization of the light takes place as it passes through the plate. Light through the midportion of the Babinet compensator is no longer returned to the medium at a value to support lasing due to the change in polarization by the phase plate. At any location, where the polarization change by the Babinet compensator is neutralized by the polarization change in the phase plate, then the light at that location is returned to the medium for supporting lasing action. A single Babinet compensator and one electro-optic phase plate arranged in the laser cavity is all that is needed to obtain a light output at any one of a plurality of parallel planes. A second Babinet compensator, oriented at 90 degrees to the first compensator, and a second electro-optic phase plate, both separated by a polarizer from the first elements, may be added to limit the lasing action to any selected filament.

An object of this invention is to provide improved means for controlling the operation of a laser so that it emits light from selected filaments.

Another object is to provide a laser having means including an electro-optic phase plate associated therewith for effecting lasing action in selected filaments of a negative temperature medium by varying the voltage applied to the phase plate.

Still another object is to provide a laser having a Babinet compensator and an electro-optic phase plate arranged within its cavity and operating to effect lasing action in selected filaments of a negative temperature medium.

Yet another object is to provide a laser having means including a pair of Babinet compensators located within its cavity and oriented relative to each other at 90 degrees for effecting lasing action within selected filaments.

The foregoing and other objects, features and advantages of the invention will be apparent from the following more particular description of preferred embodiments of the invention as illustrated in the accompanying drawings.

In the drawings:

FIG. 1 is a perspective view of mechanisms associated with a laser for effecting lasing action in filaments lying in selected planes of a negative temperature medium.

FIG. 2 is a perspective view of a Babinet compensator used in FIG. 1 and showing the orientation of its optical axes.

FIG. 3 is a front elevational view of the control mechanisms used in FIG. 1 and showing the polarization of light at different points under certain operating conditions.

Figure 4:
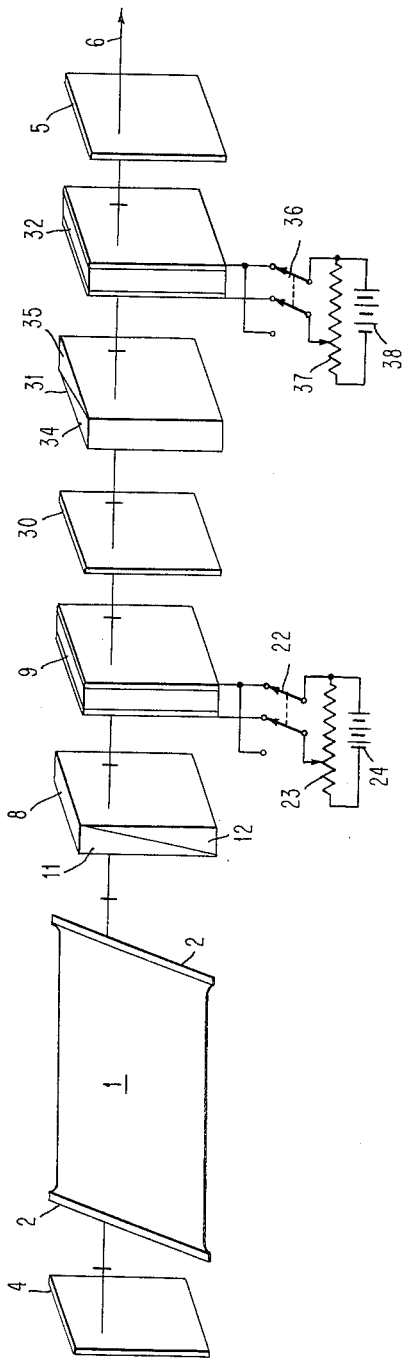
FIG. 4 is a view like that of FIG. 1 but including additional control mechanisms for effecting a lasing action in any selected filament of a negative temperature medium.

FIGS. 5a to 5f indicate the polarization of light at different points in FIG. 4 looking from right to left.

FIG. 6 is a view of the control mechanisms of FIG. 4 associated with a different type laser and operating through a character mask to effect printing.

Referring to the drawings, and more particularly to FIG. 1, it will be noted that there is shown a laser including a medium 1, which emits light when subjected to the energy of a pumping light L. At the ends of the medium 1 are Brewster windows 2 which pass to and from the medium without loss only that light which is polarized in the plane of the paper. In axial alignment with the medium 1 is a full reflecting mirror 4 and a partially reflecting mirror 5 which passes some of the light from the medium 1 as an output beam 6. Arranged between the medium 1 and the mirror 5 is a Babinet compensator 8 and an electro-optic device 9 acting together to change the polarization of the light in a desired manner.

The Babinet compensator is made of two wedge-shaped quartz crystals 11 and 12 cut at very small angles and having their optic axes oriented perpendicular to each other in the diagonals of the entrance face, as indicated by the arrows 14 and 15 in FIG. 2. Light from the medium 1 polarized in the plane of the paper as indicated, is divided within the compensator into two equal components, the ordinary ray and the extraordinary ray. The extraordinary ray oscillates parallel to the optic axis of crystal 11 and travels slower than the ordinary ray which oscillates with its electric vector perpendicular to the optic axis. A phase shift is introduced between the ordinary and the extraordinary rays in crystal 11 varying with the difference between their optical path lengths. As the light enters crystal 12, the ordinary ray in crystal 11 becomes an extraordinary ray and the extraordinary ray becomes an ordinary ray. This is due to the fact that the optic axes of the two crystals are perpendicular to each other. The result is that the phase shift introduced in the first crystal tends to be cancelled by the phase shift introduced in the second crystal. Along the portions of the crystals midway between their ends where the transverse dimensions are equal, the cancellation is complete and the polarization of the light at the output side of the compensator is the same as the polarization of the light entering the compensator. At each side of the crystals' midportions, one ray will be behind or ahead of the other because of the different path lengths. A phase shift takes place and the ordinary and extraordinary rays compose to an elliptical oscillation.

To describe mathematically the manner in which a phase shift takes place at some arbitrary point, the thickness of the first crystal at such point may be designated $t_1$ and the thickness of the second crystal may be designated $t_2$. The refractive indices of the ordinary ray and of the extraordinary ray are $n_o$ and $n_{eo}$, respectively. The total phase shift $s$ introduced between the ordinary and extraordinary rays is:

$$f = \frac{2\pi}{\lambda} (n_{eo} - n_o)(t_1 - t_2)$$

where $\lambda$ is the wave length of light. It is obvious that the phase shift for a fixed $\lambda$ depends only on the difference in the thickness of the two crystals. The Babinet compensator of FIG. 1 is designed to produce a phase difference of $\pi$ between light passing it at the top and that passing it at the bottom. The absolute value of phase shift introduced between the ordinary ray and the extraordinary ray at the top and at the bottom is $\pi/2$, thus causing plane polarized light at these points to become circularly polarized. The directions of the phase shift are different, however, that at the top being circularly polarized in a left hand direction, while that at the bottom is circularly polarized in a right hand direction. In areas between the midportion and the ends, the light is elliptically polarized in degrees varying with the amount of phase shift.

The elecetro-optic device 9 includes an electro-optic crystal 20 which may be, for example, a potassium dihydrogen phosphate crystal, and a pair of transparent electrodes 21 at opposite sides of the crystal. Electrodes 21 are connected to terminals of a switch 22 which may be operated to subject the device 9 in either direction to the voltage drop in a variable resistor 23 across which a DC voltage is applied by a battery 24. With the switch open as shown in FIG. 1, no phase shift takes place in the electro-optic device 9. Light from the negative temperature medium 1 passing through the midportion of the Babinet compensator 8 is not changed in polarization by either the compensator or the device 9. This light is reflected by the mirror 5 back through the device 9 and the compensator 8 to the medium 1 still at the same polarization. Since the Brewster windows pass light of this polarization without loss, the light passes through the medium 1 and effects a lasing action in this portion of the medium. At the opposite end of the medium, the light impinges upon the mirror 4 which reflects it again back through the medium 1. Plane polarized light passing from the medium through the upper and lower portions of the Babinet compensator is circularly polarized as indicated. The device 9 produces no change in the polarization of the light and so it is reflected back to the compensator still circularly polarized. As light of this polarity passes again through the compensator, it becomes plane polarized perpendicular to the plane of the paper and is reflected by the Brewster window 2 downwardly, as shown. In areas between the midportion and the ends, light is returned toward the medium 1 either circularly or elliptically polarized and the Brewster window passes to the medium 1 only the component polarized in the plane of the paper. This component increases toward the midportion where it reaches a maximum value. The area along the midportion where lasing takes place is very narrow, the width of the area for a given Babinet compensator depending on the pumping power of the laser. When it is pumped far above threshold, the lasing area is broad, but a pumping close to threshold results in a very narrow lasing portion. Since light is obtained only from the medium filaments which are lasing, then the light resulting from the arrangement of FIG. 1 is in a horizontal plane midway between the upper and lower ends of the compensator 8, and part of this light passes through the mirror 5 as an output beam 6.

When the electro-optic device 9 is made active, by closing the switch 22, to effect a constant opposite phase shift in the light passing through it, the level of lasing action is shifted upwardly a distance depending on the amount of phase shift effected. Referring to FIG. 3, it will be noted that the device 9 is energized by closing the switch 22 to effect an opposite phase shift of 45 degrees. Light passing from the laser through the midportion of the Babinet compensator again experiences a zero phase shift. This light becomes elliptically polarized, however, on passing through the electro-opotic device 9 and, after being reflected by the mirror 5 back through the device 9, it becomes circularly polarized at the compensator 8. No further change in the polarization of this light takes place but only a component of the light enters the medium 1 and is insufficient to effect lasing. Between the midportion and the upper end of the compensator, the light from the laser is elliptically polarized. The electro-optic device now changes this back to a polarization in the plane of the paper. As the light is reflected by the mirror 5 through the device 9 it becomes elliptically polarized in the opposite direction and, on passing through the Babinet compensator, it becomes polarized again in the plane of the paper. This light is passed by the Brewster window 2 to the medium and effects lasing action at that level. Light returned to the Brewster window at all of the other levels varies in polarization between that accepted by the Brewster window and plane polarization perpendicular to the plane of the paper. As the voltage applied to the electro-optic device is increased, the level at which lasing action takes place moves upwardly. When the switch 22 is operated to reverse the voltage applied to the electro-optic device, the level of lasing action moves to a position between the midportion of the compensator 8 and its lower end.

FIG. 4 shows an arrangement like that of FIG. 2 but including a polarizer 30, a second Babinet compensator 31 and a second electro-optic device 32. The compensator 31 has crystals 34 and 35 oriented at 90 degrees to the crystals 11 and 12 of the compensator 8. Polarizer 30 is arranged to pass only light which is polarized in the plane of the paper. The electro-optic device 32 is like the device 9 and may be subjected to a voltage in either direction under control of a switch 36 connected to a variable resistor 37 across which a DC voltage is applied by a battery 38.

When both switches 22 and 36 are open, light passes from the laser through the compensator 8 and the electro-optic device 9 in the same manner as that described above. Light midway between the upper and lower ends of the compensator 8 remains polarized in the plane of the paper and passes through the polarizer 30. Since the crystals 34 and 35 of the compensator 31 are rotated 90 degrees, it is only light midway between its front and rear edges that passes through it without change in polarization. Light reaching compensator 31 along its vertical center line is maximum at the center and reduces in both directions due to the fact that the compensator 8 causes an increasing change in the polarization of the light with increasing distances from the horizontal center line. Only the vertical component of the light at these different polarizations is passed by the polarizer 30. The light at the intersection of the vertical and horizontal center lines through the compensators 8 and 9 is the only part that passes through them without loss. This light is reflected back by the mirror 5 through the centers of the compensators still without loss and effects lasing only within the filament at the axis of the laser. Light reaching the compensator 31 along the horizontal center line is at full intensity but this compensator causes changes in polarization, except at the midpoint of the center line, as light passes through it in both directions and the components of light passed by the polarizer 30 in its return toward the medium 1 are at reduced intensity.

Figure 5C:
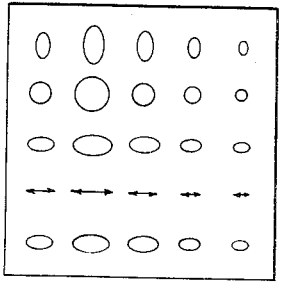
Figure 5F:
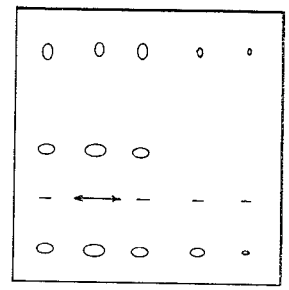
Figure 5B:
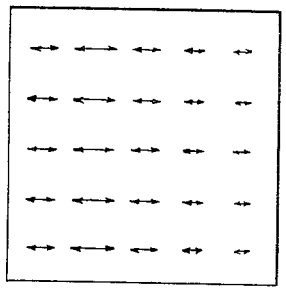
Figure 5E:
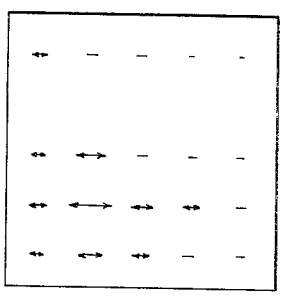
Figure 5A:
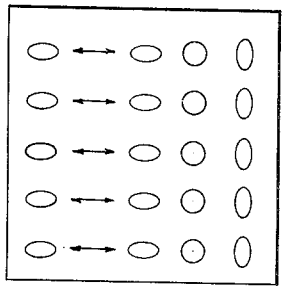
Figure 5D:
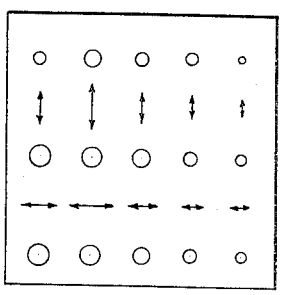

With the switches 22 and 36 closed as shown in FIG. 4, a single filament of the medium 1 spaced upwardly and forwardly of its axis is caused to lase. Assuming that each of the electro-optic devices 9 and 32 cause a 45 degree phase shift at this time, the polarization of the light at different points as it passes to the right between the device 9 and the polarizer 30 is like that shown in FIG. 5a. Polarizer 30 then passes only the vertical components of light as shown in FIG. 5b. It will be noted that all of the light midway between the horizontal center line and the upper end is the only part at full intensity. The compensator 31 now causes changes in polarization except along its vertical center line, and the electro-optic device 32 causes further polarization changes. The polarization change by the device 32 is just sufficient to neutralize the change by the compensator along the line midway between its vertical center line and its front edge. This results in light polarizations and intensities at the mirror 5 as shown in FIG. 5c. As the light passes to the left after reflection from mirror 5 it is again changed in polarization by the electro-optic device 32 and the Babinet compensator 31 so it arrives at the polarizer 30 polarized at different points as indicated by FIG. 5d. After the light has passed through the polarizer 30 toward the medium 1, it is all polarized in the plane of the paper at greatly reduced intensities except at the center of the upper left quadrant looking from right to left as indicated in FIG. 5e. The light now passes through the electro-optic device 9 and the Babinet compensator 8 arriving at the Brewster window 2 polarized as indicated in FIG. 5f. Light at the center of the upper left quadrant is still at full intensity and polarized in a direction to pass the Brewster window without loss. The filament in the medium 1 corresponding to this point will have a lasing action effected within it but lasing will be cut off at all the other filaments. An output light beam 6 is now obtained from the mirror 5 at a point corresponding to the single lasing filament in the medium 1. By operating the switches 22, 36 and varying the voltages applied to the devices 9 and 32, an output light beam 6 may be obtained at any desired point.

It will be appreciated that other laser media and cavity structures, such as spherical cavities, hemispherical cavities and confocal cavities may be employed with the control means of FIGS. 1 to 4 to effect selective lasing action. As shown in FIG. 6, a medium 1, like that of FIG. 1, has a mirror 40 of spherical shape adjacent its left end. Adjacent the opposite end of the medium is a lens 41 having a focal length equal to that of the mirror 40. Lens 41 and mirror 40 are so arranged that their focal points coincide at point P. Between the lens 41 and the plane output mirror 5 are the Babinet compensators 8 and 31, the electro-optic devices 9 and 32, and the polarizer 30 arranged in the same manner as that shown in FIG. 4. These mechanisms operate the same as described above to determine the polarization of light passing the medium 1 and the mirror 5. Due to the action of the mirror 40 and the lens 41, however, lasing action within the medium 1 is effected in angular degenerating filaments instead of spacial degenerating filaments as in FIG. 4.

Since the mechanisms of FIGS. 4 and 6 may be operated, by varying the voltages applied to the electro-optic devices 9 and 32, to produce an output light beam at any desired point on the mirror 5, other mechanisms may be added for effecting a printing of information varying with the location of the output beam. As shown in FIG. 6, a mask 44 located at the output side of the mirror 5 has character shaped portions through which an output light beam may be passed. The light beam takes the shape of the character through which it passes and is directed by a lens 45 to the surface of a light sensitive material 46. Any suitable means, not shown, may be employed by advancing the material 46 as information is recorded upon it.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for producing a scanned laser beam comprising, in combination,
   means for producing a pumping radiation,
   means including a laser medium operating to emit light of a given polarization when subjected to said pumping radiation,
   mirrors at opposite ends of said light emitting means for reflecting emitted light back to it, the reflected light effecting a lasting action within said apparatus when its polarization is the same as that of the light emitted and its intensity is above a predetermined value,
   and means arranged between said medium and said mirrors for directing back to said medium an elemental portion of the light with the given polarization and all other elemental portions with polarizations differing from said given polarization, whereby the elemental portion with the given polarization effects the lasing action and all other elemental portions are reduced in intensity below the predetermined value.

2. The apparatus of claim 1 in which said last-mentioned means includes a first device effecting a gradient variable phase shift on all light portions emanating from said medium, and a second device operable to effect a phase shift equal and opposite to that effected by said first device to select said elemental portion.

3. The apparatus of claim 1 in which said last-mentioned means includes a Babinet compensator transversely arranged in the path of all portions of the emitted light for effecting a phase shift increasing from zero at its midportion to $\pi/2$ at one end and $$-\frac{\pi}{2}$$

at the opposite end, the midportion of said compensator being arranged to intercept the center portion of the emitted light, and an electro-optic device operable to effect phase shifts varying between zero and $\pi/2$ in either direction.

4. The apparatus of claim 1 in which said last-mentioned means includes a pair of Babinet compensators transversely arranged in the path of the emitted light and oriented at 90 degrees relative to each other, each of said compensators introducing a phase shift to light increasing from zero at their midportions to $\pi/2$ at their edges, the midportions of said compensators being arranged to intercept the center part of the emitted light, an electro-optic device associated with each of said compensators and operable to effect phase shifts varying between zero and $\pi/2$ in either direction, and a polarizer between said Babinet compensators for passing only light polarized in the same plane as that of the light emitted by said medium.

5. Apparatus for producing a scanned laser beam comprising, in combination, means for producing a pumping radiation, a laser medium operating to emit light when subjected to said pumping radiation, a Brewster window at each end of said medium for passing only light polarized in a given plane, mirrors at opposite ends of said medium for reflecting emitted light back to it, the reflected light effecting a lasing action within any portion of said medium to which it is passed by said Brewster windows above a predetermined intensity, and means arranged between said medium and one of said mirrors for directing back to said medium an elemental portion of the emitted light with the given polarization and all other elemental portions with polarizations differing from said given polarization, whereby the elemental portion with the given polarization effects the lasing action and all other elemental portions are reduced in intensity below the predetermined value.

6. A laser device comprising a laser cavity including a laser medium operative when activated to sustain lasing in plural light filaments having a single polarization, and light affecting means arranged in the cavity to provide all but one filament with differing polarizations from the single polarization so that lasing of all but the one filament is extinguished, the light affecting means comprising first means positioned in the cavity in the path of all light filaments for effecting a gradient variable phase shift on the polarization of the filaments, and second means optically coupled with the first means to effect a phase shift equal and opposite to that effected by the first means on any filament, whereby the one filament is selected for lasing.

References Cited

UNITED STATES PATENTS

| | | | |
|---|---|---|---|
| 2,976,764 | 3/1961 | Hyde et al. | 350—157 |
| 3,180,216 | 4/1965 | Osterberg | 331—94.5 |
| 3,229,223 | 1/1966 | Miller | 331—94.5 |
| 3,293,565 | 12/1966 | Hardy | 331—94.5 |
| 3,316,501 | 4/1967 | Collins et al. | 331—94.5 |

RONALD L. WIBERT, Primary Examiner

U.S. Cl. X.R.

350—150, 160